March 10, 1925.  1,529,615

E. P. CHARPENTIER

FISHHOOK

Filed Jan. 10, 1924

Inventor
E. P. Charpentier,
By
Attorney

Patented Mar. 10, 1925.

1,529,615

UNITED STATES PATENT OFFICE.

EDWARD P. CHARPENTIER, OF SAN PEDRO, CALIFORNIA.

FISHHOOK.

Application filed January 10, 1924. Serial No. 685,418.

*To all whom it may concern:*

Be it known that I, EDWARD P. CHARPENTIER, a citizen of the United States, residing at San Pedro, in the county of Los Angeles and State of California, have invented certain new and useful Improvements in Fishhooks; and I do hereby declare the following to be a full, clear, and exact description of the invention, such as will enable others skilled in the art to which it appertains to make and use the same.

This invention relates to a fish hook.

It is aimed to provide a novel construction particularly adapted for use when trolling in that weeds will not be a hindrance to its movement; in that it will not likely tear the mouth of the fish so that the latter will be lost, and in that bait will be unnecessary.

A further object is to provide a novel construction in which the main part may be made from a single strand of wire or similar material.

Additional objects and advantages will become apparent from a consideration of the description following taken in connection with accompanying drawings illustrating an operative embodiment.

In the drawings:—

Like reference characters designate like or similar parts in the different views.

Figure 1:
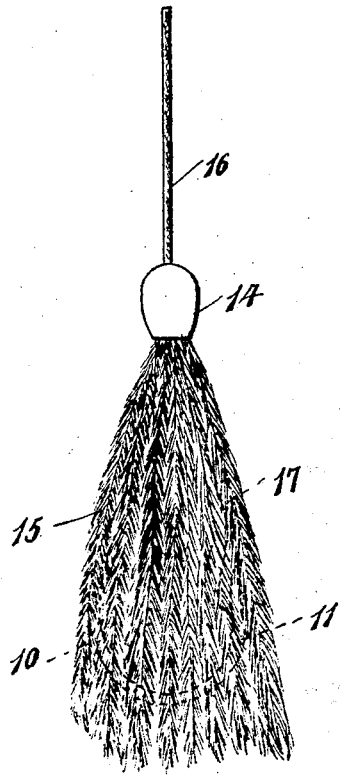
Figure 1 is an elevation of the improved hook.

In reducing the invention to practice, a single strand of metallic wire or other stock is used as at 10 whose terminals are formed into hooks 11, sharpened at their extremities 12, and in spaced, preferably diverging relation as shown. The intermediate portion of the strand is bent so as to form a guard having spaced loops 13 on opposite sides of the longitudinal median line of the hook and opposite the extremities 12 so that the latter will normally extend partly into the openings of the loops. The strand 10 from the loops 13 converges similarly to the hooks and like the same are led to the upper portion of the hook. The upper portion of the hook is embedded for instance in a body of lead or similar metal as at 14. In lieu of the lead, such upper end may be reinforced or stiffened as by a plate or otherwise as preferred. The body 14 serves to fasten feathers 15 in place which may completely surround the hook and serve to conceal its metallic parts. The equivalent of feathers of course may be substituted for them and it will be understood that they are free of connection except at their upper ends. Also, the body 14 may serve to connect a fishing line 16 to the hook or such part may be an attaching strand or gut adapted for connection to the line.

The strand 10 is made of relatively stiff material so that it will normally maintain the shape shown in full lines in the drawings. However, the guard at the portions thereof adjacent the body 14, intermediate the arrows 17, is treated so that the same will be resilient and normally tend to maintain the guard closed, that is with the extremities 12 disposed in the loops 13.

It is important that the two hooks be provided since in connection with the fishing where it is intended for use, a single hook frequently tears the mouth of the fish and causes the same to be lost. By reason of the provision of the plurality of hooks, this danger is obviated.

Figure 2:
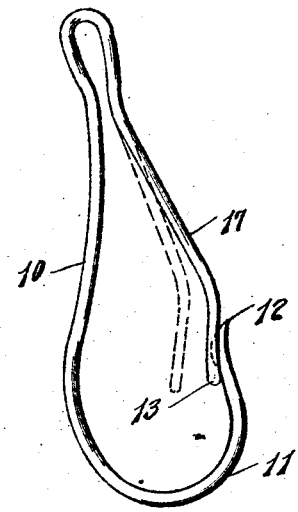
Figure 2 is a similar view devoid of feathers with the releasing movement of the guard being suggested by dotted lines.
Figure 3:
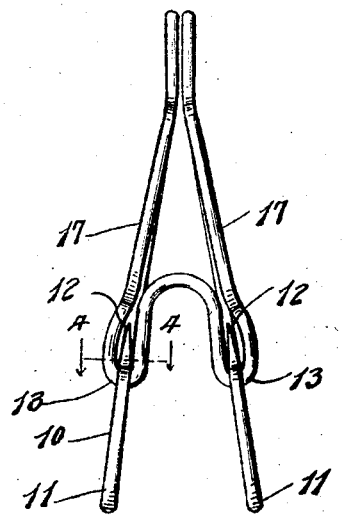
Figure 3 is a view similar to Figure 2 taken at a right angle thereto.
Figure 4:
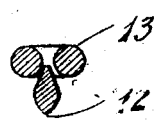
Figure 4 is a cross sectional view taken on the line 4—4 of Figure 3.

The hook is preferably used in trolling, for instance for tuna and albacore fish, but of course no limitation in this connection is to be inferred, and lines equipped with the hooks are cast from the rear of a vessel traveling say at six to ten miles per hour. No bait is used on the hooks. The fish upon striking the hooks receive the same in their mouths and thus engage the guard, depressing it to the dotted line position of Figure 2, against the tension of the spring portion 17 whereupon the hooks 11, with the extremities 12 foremost, penetrate the mouth of the fish thus catching it, after which the guard is restored to normal position by the spring 17 so that the fish cannot escape. It is to be noted that the hook does not have any barbs and that the matter of removing a fish is an extremely simple one since the guard is depressed by the fisherman and the fish pulled off of the hooks are permitted to fall therefrom. It is a great saving in time and enables more expeditious fishing, when it is considered that lines are used, perhaps twelve at a time, under care of a single fisherman.

I claim as my invention:—

1. A fish hook made from a strand of material having the intermediate part formed into a guard provided with laterally spaced loops, the portion of the strand extending from said loops being formed into relatively large loops disposed substantially in planes at a right angle to the first mentioned loops, the distal end portions of the strand constituting hooks having their terminals closed by the first mentioned loops.

2. A fish hook made from a strand of material having its extremities formed into hooks, the intermediate part being formed into a guard, said guard having loops normally disposed in closing relation to the extremities of the hooks, said guard being yieldable with respect to the hooks, concealing means for the hooks and guard surrounding the same, and a body at the junction of the guard and hooks securing said concealing means in place.

In testimony whereof I affix my signature in presence of two witnesses.

EDWARD P. CHARPENTIER.

Witnesses:
 ROBERT C. BALY,
 REBECCA MEYER.